US007758295B2

(12) United States Patent
Liu et al.

(10) Patent No.: US 7,758,295 B2
(45) Date of Patent: Jul. 20, 2010

(54) HANDLING DEVICE AND METHOD FOR THE SAME

(75) Inventors: Ming-Hsun Liu, Taipei (TW); Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 0 days.

(21) Appl. No.: 11/746,637

(22) Filed: May 9, 2007

(65) Prior Publication Data

US 2008/0277854 A1 Nov. 13, 2008

(51) Int. Cl.
*B25J 18/00* (2006.01)

(52) U.S. Cl. ................ 414/744.3; 74/89.33; 248/125.2; 248/125.7

(58) Field of Classification Search ................. 414/663, 414/665, 744.3, 672, 744, 785; 74/127, 89.33; 248/124.1, 125.2, 125.7
See application file for complete search history.

(56) References Cited

U.S. PATENT DOCUMENTS 3,311,030 A * 3/1967 Halstead ...................... 92/118
3,618,408 A * 11/1971 Koseff ........................ 74/89.38
4,250,762 A * 2/1981 Weatherby ................. 74/89.38
4,306,634 A * 12/1981 Sangster ..................... 414/663
4,436,294 A * 3/1984 Irelan ............................ 269/6
4,509,379 A * 4/1985 Westmoreland ................ 74/58
4,824,320 A * 4/1989 Zwijnenburg ............ 414/744.3
4,978,274 A * 12/1990 de Groot .................. 414/744.3
5,160,238 A * 11/1992 Kambara .................... 414/663
5,241,870 A * 9/1993 Holt .......................... 73/866.5
5,271,702 A * 12/1993 Dobbs et al. ........... 414/223.01
5,275,045 A * 1/1994 Johnston et al. .......... 73/379.01
5,566,856 A * 10/1996 Fallen et al. .......... 221/150 HC
5,570,990 A * 11/1996 Bonora et al. ............... 414/543
5,622,251 A * 4/1997 Rantanen .................... 198/747
6,129,320 A * 10/2000 Warren-Pfaeffle ........ 248/124.1
7,632,057 B2 * 12/2009 Liu et al. ................. 414/744.3

* cited by examiner

*Primary Examiner*—James Keenan
(74) *Attorney, Agent, or Firm*—Rosenberg, Klein & Lee

(57) ABSTRACT

A handling device and method utilizes a clamping arm that is mounted on a guide rod. The axial direction and the rotation direction of the guide rod are intersected each other at right angles. Makes the clamping arm rotate in the rotation direction of the guide rod when the clamping arm is not restricted, and makes the clamping arm move in the axial direction of the guide rod when the clamping arm is restricted. By such arrangements, the clamping arm can perform handling in the horizontal direction and in the vertical direction.

3 Claims, 5 Drawing Sheets

HANDLING DEVICE AND METHOD FOR THE SAME

BACKGROUND OF THE INVENTION

1. Field of the Invention

The present invention relates to a handling device and method, and more particularly to a handling device that utilizes a clamping arm to move horizontally and vertically to perform handling operation.

2. Description of the Prior Art

In the automatic flow, handling is the most basic operation step and is used most widely. With the development of science and the micromation of technique, handling step is used more and more widely in many fields. For example, in the replication and production of optical discs, a disc handling device is a necessary mechanism for moving between different machines. However, a conventional disc handling device has to use complex connecting rod structure and control system to move discs in the horizontal direction or vertical direction. It is obvious that the more complicated structure of the conventional handling device is, the higher the failure rate brings, and maintenance fee consequently increases. Therefore a simple structure that can achieve the objective of handling goods is needed to improve the automatic technique.

The present invention has arisen to mitigate and/or obviate the afore-described disadvantages.

SUMMARY OF THE INVENTION

The primary objective of the present invention is to provide a handling device that utilizes a clamping arm to be screwed on a guide rod, and a housing and a locking member controls the clamping arm to move in the horizontal direction and vertical direction, therefore achieving the objective of handling goods.

The secondary objective is to provide a handling method that utilizes a clamping arm to be movably mounted on a guide rod, making the clamping arm move in the rotation direction of the guide rod under the condition that the clamping arm is not restrained, and making the clamping arm move in the axial direction of the guide rod under the condition that the clamping arm is restrained.

In order to achieve the abovementioned objectives, the handling device in accordance with the present invention comprises a guide rod, a clamping arm, a housing and a locking member. The axial direction and the rotation direction of the guide rod are intersected each other at right angles. According to an embodiment of the present invention, the axial direction of the guide rod is in the vertical direction, and the rotating direction of the guide rod is in the horizontal direction. The clamping arm is movably mounted on the guide rod. The housing is formed with a longitudinal gap for a mounting the clamping arm, and movably abuts the clamping arm in the meantime. The locking member detachably locks and positions the housing.

When performing handling operation, the handling device firstly utilizes the clamping arm to clamp goods. Rotating the guide rod under the condition that the locking member doesn't lock and position the housing, the clamping arm will be driven to urge the housing to move in the rotation direction of the guide rod. Rotating the guide rod under the condition that the locking member locks and positions the housing, the rotation movement of the clamping arm will be restricted by the housing, so that the clamping arm cannot move in the rotation direction of the guide rod and will move in the axial direction along of the guide rod. The clamping arm can handle goods to the destination through the horizontal and the vertical movement. After that the clamping arm finishes handling operation by releasing the goods.

In addition, the clamping arm is provided with a nut, and the clamping arm is screwed on the guide rod through the nut.

The housing can be tubular-shaped, and the axial length of the housing corresponds to the length of the guide rod.

DETAILED DESCRIPTION OF THE PREFERRED EMBODIMENTS

Figure 1:
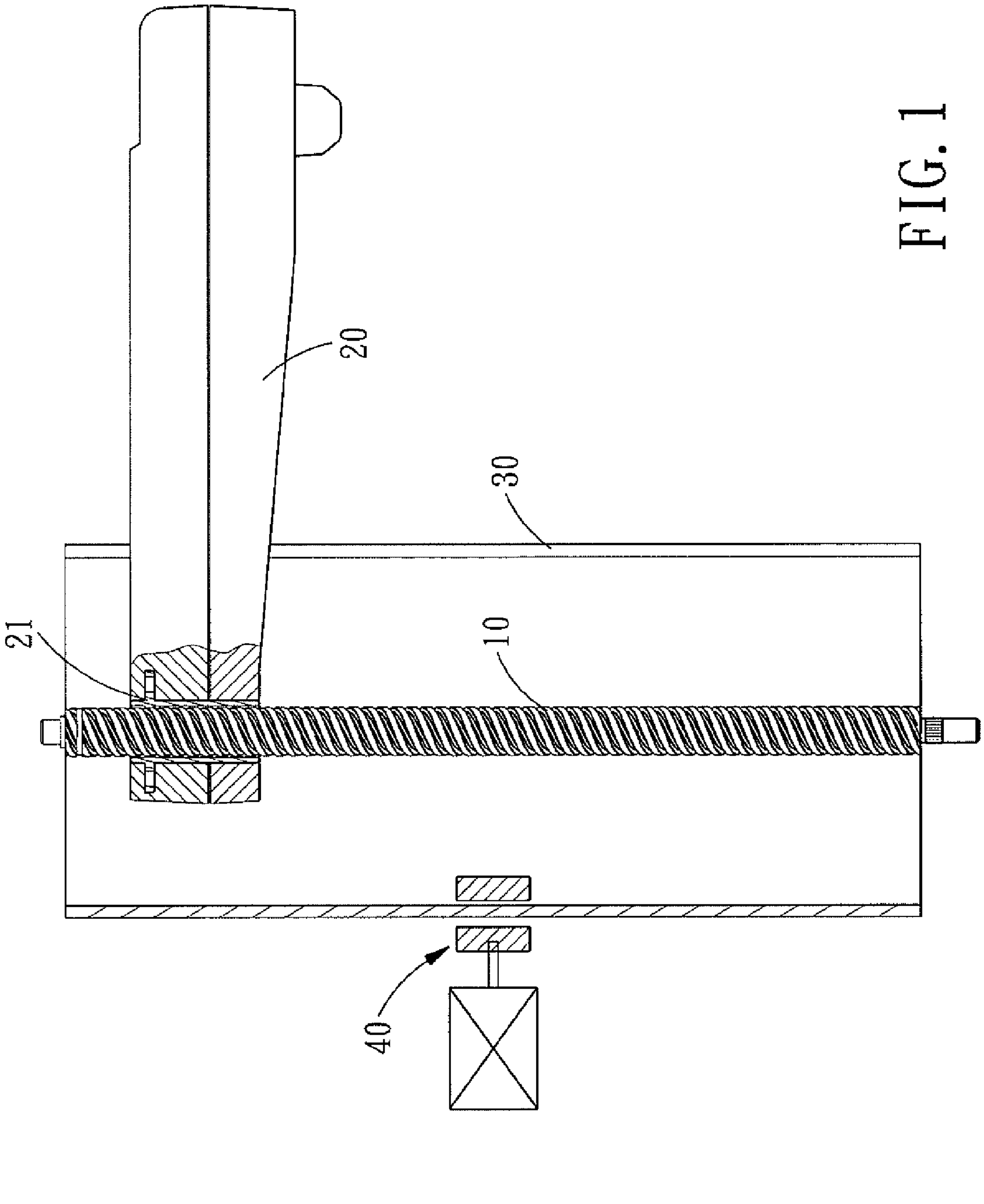
FIG. 1 is a side perspective view of a handling device in accordance with an embodiment of the present invention.
Figure 2:
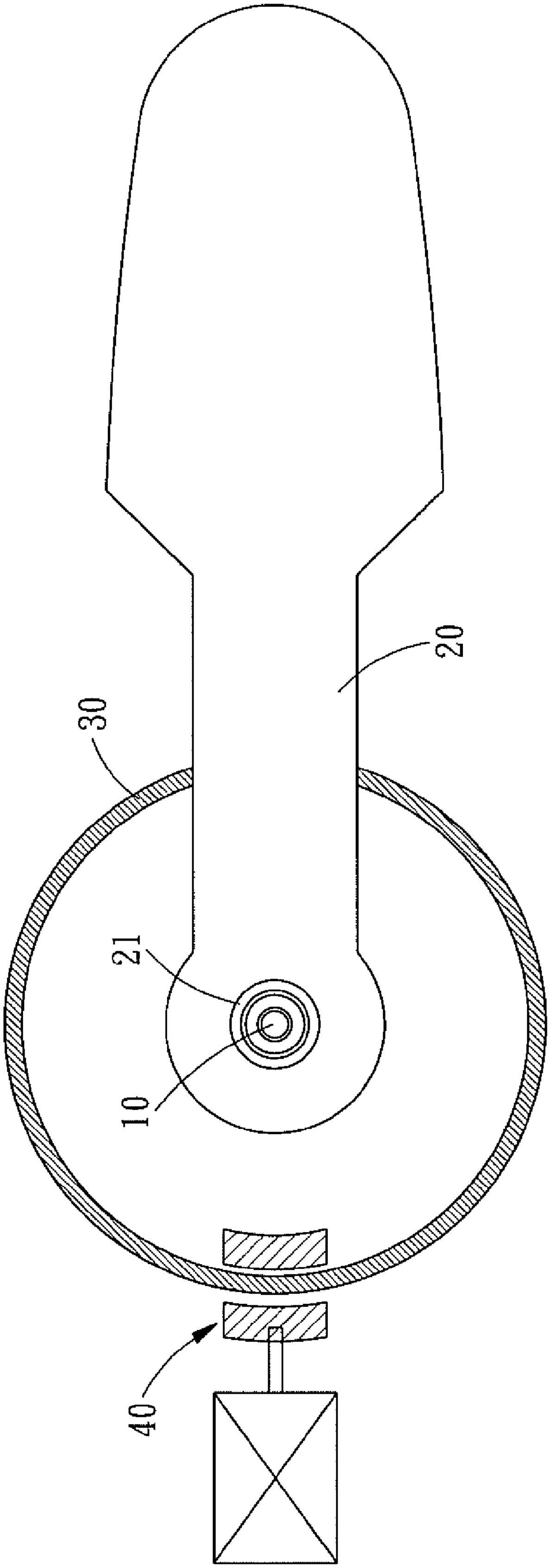
FIG. 2 is a plan perspective view of the handling device in accordance with the embodiment of the present invention.

The present invention will be more clear from the following description when viewed together with the accompanying drawings, which show, for purpose of illustrations only, the preferred embodiment in accordance with the present invention.

Referring to FIGS. 1-5, a handling device in accordance with the present invention comprises a guide rod 10, a clamping arm 20, a housing 30, and a locking member 40.

According to an embodiment of the present invention, the axial direction of the guide rod 10 is in the vertical direction, and the rotating direction of the guide rod 10 is in the horizontal direction. The guide rod 10 can be a screw rod.

The clamping arm 20 is provided with a nut 21 that has an outer side and an inner side. The outer side of the nut 21 is fixed to the clamping arm 20, and the inner side is provided with threads and is directly screwed on the guide rod 10.

The housing 30 is tubular-shaped and surrounds the guide rod 10 in the horizontal direction, and the axial length of the housing 30 corresponds to the length of the guide rod 10. The housing 30 movably clamps the clamping arm 20 in the meantime.

The locking member 40 detachably locks and positions the housing 30. The locking member 40 is like an ordinary brake device, which can be actuated by methods: such as liquid pressure, air pressure, electromagnetic control or mechanical motion, and all of these are conventional methods and will not be further discussed.

Figure 3:
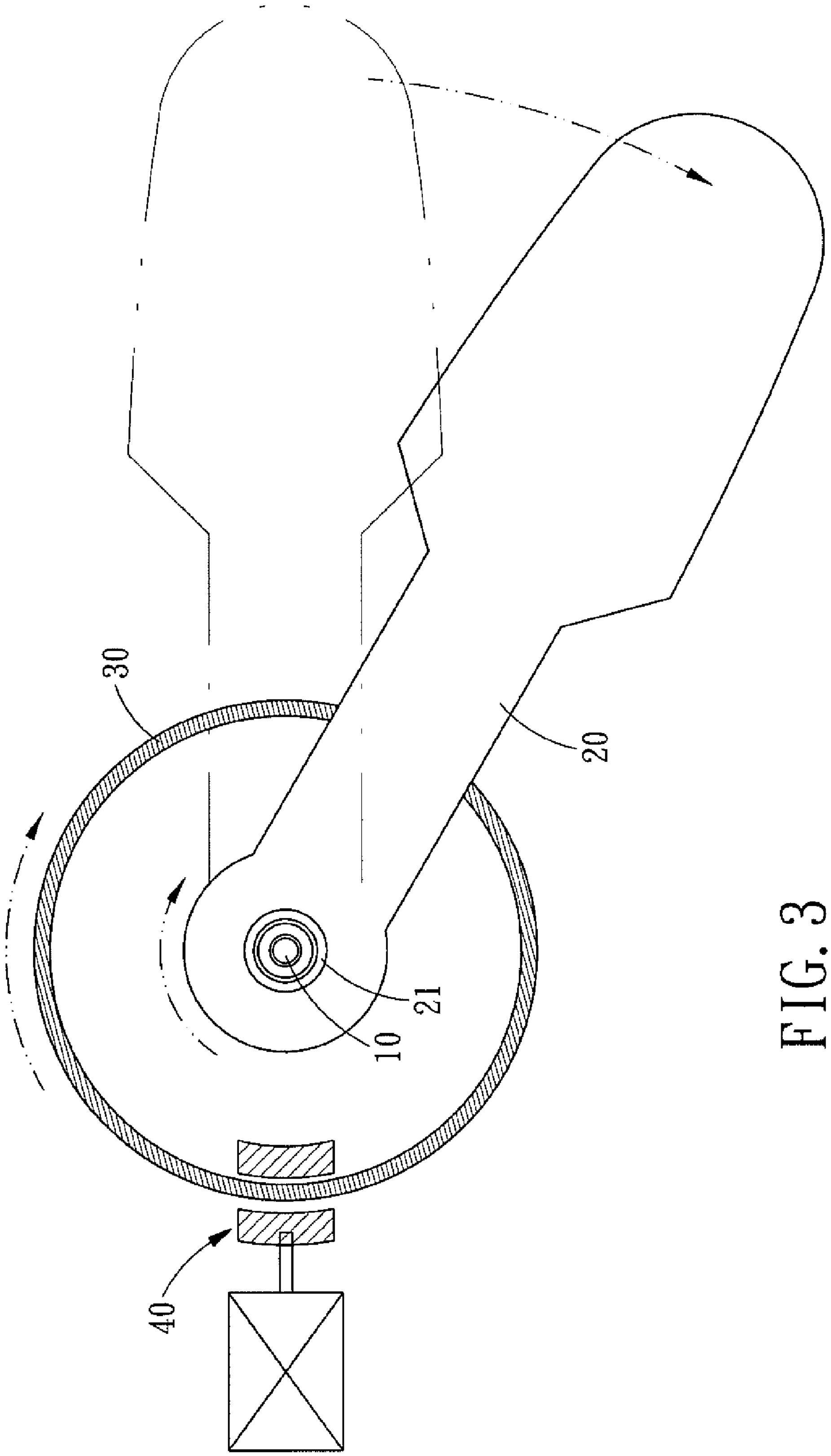
FIG. 3 is a perspective view in accordance with the embodiment of the present invention of showing that the clamping arm moves in the rotation direction.

The handling device in accordance with the present invention can achieve an objective of handling goods through the abovementioned structures. Firstly, by rotating the guide rod 10 when the locking member 40 disengages from the housing 30, as shown in FIG. 3, the clamping arm 20 will rotate with the guide rod 10 synchronously and drive the housing 30 to rotate, so that the clamping arm 20 moves in the horizontal direction.

Figure 4:
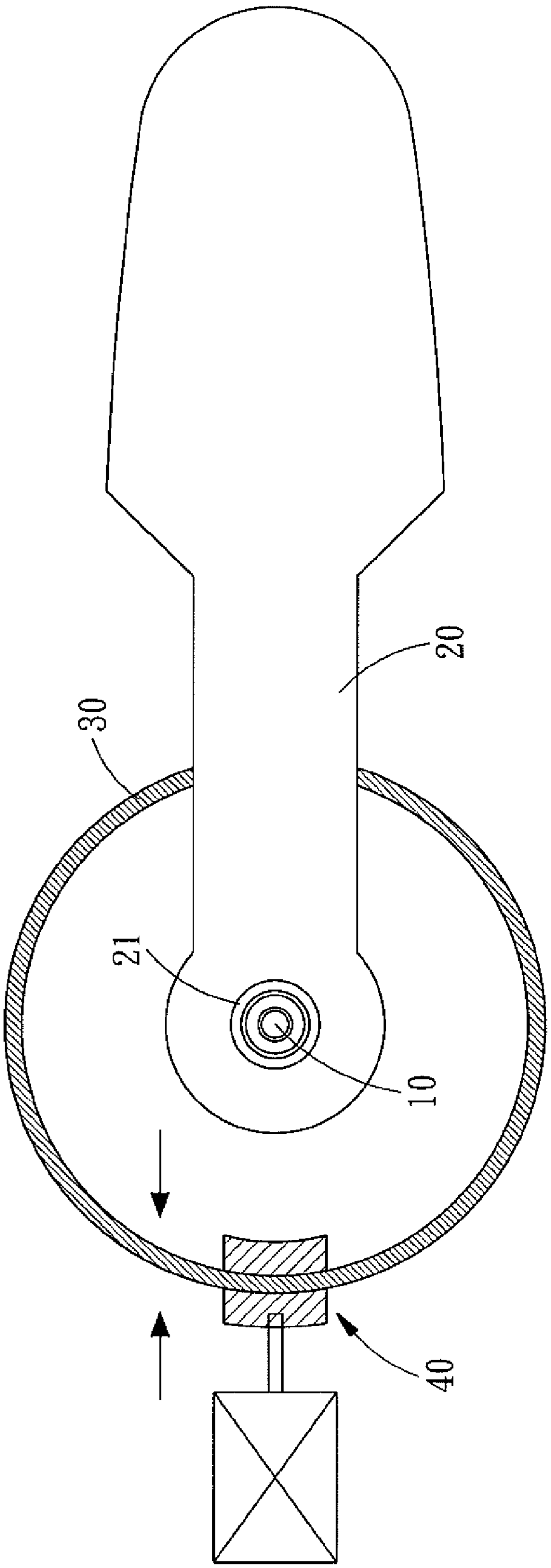
FIG. 4 is a perspective view in accordance with the embodiment of the present invention of showing the locking member locks and positions the housing.
Figure 5:
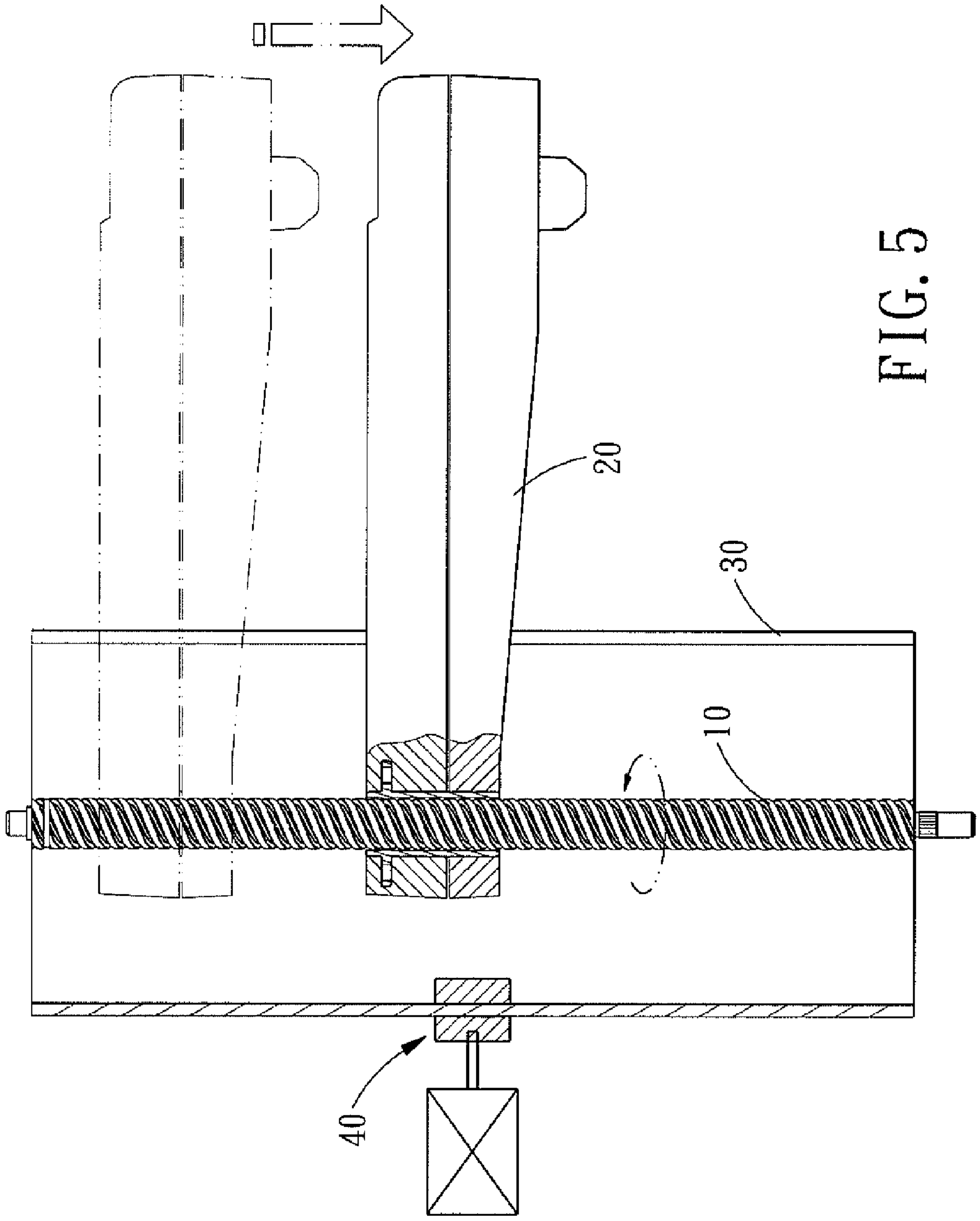
FIG. 5 is a perspective view in accordance with the embodiment of the present invention of showing that the clamping arm moves in the axial direction.

Contrarily, by rotating the guide rod 10 when the locking member 40 locks and positions the housing 30, as shown in FIG. 4 and FIG. 5, the housing 30 cannot rotate and will stop the horizontal movement of the clamping arm 20, so that the clamping arm 20 cannot rotate. Since the movement in the horizontal direction is restricted, the clamping arm 20 will move up and down in the vertical direction along with the rotation of the screw.

It can be learned that the abovementioned structures can control the horizontal and vertical movement of the clamping arm 20, and the clamping arm 20 can handle the goods as mentioned above.

A goods handling method of the handling device comprises the steps of: clamping goods with the clamping arm 20; making the clamping arm 20 move in the horizontal direction synchronously along with the rotation of the guide rod 10 under the condition that the horizontal movement of the clamping arm 20 is not restricted; making the clamping arm 20 move in the vertical direction synchronously along with the rotation of the guide rod 10 under the condition that the horizontal movement of the clamping arm 20 is restricted; handling goods to the destination through the horizontal and the vertical movement of the clamping arm 20; and finishing handling operation by releasing the goods.

The handling device utilizes a clamping arm that is screwed on the guide rod, and controls the horizontal movement of the clamping arm, so that the clamping arm can move in the horizontal direction or in the vertical direction. The handling device can achieve the objective of handling goods by simple structures, reducing malfunction and cost.

To summarize, the present invention relates to a handling device and method, which utilizes a clamping arm that is screwed on the guide rod. The axial direction and the rotation direction of the guide rod are intersected each other at right angles. The clamping arm is movably mounted on the guide rod. The housing is formed with a longitudinal gap for a mounting the clamping arm, and movably abuts the clamping arm in the meantime. The locking member detachably locks and positions the housing. Makes the clamping arm rotate in the rotation direction when the clamping arm is not restricted, and makes the clamping arm move in the axial direction of the guide rod when the clamping arm is restricted. By such arrangements, the clamping arm can perform handling in the horizontal direction and in the vertical direction.

While we have shown and described various embodiments in accordance with the present invention, it is clear to those skilled in the art that further embodiments may be made without departing from the scope of the present invention.

What is claimed is:

1. A handling device comprising:

a vertically disposed guide rod having a plurality of threads on its outer surface and being driven to rotate;

a clamping arm being movably mounted on the guide rod and being able to move both in horizontal direction and vertical direction when being driven by the guide rod;

a singular C-shaped housing being formed with a single gap, the single gap defining a single linearly directed longitudinal gap for the clamping arm to move therein in such a manner that the clamping arm partially extends out of the longitudinal gap of the housing, the C-shaped housing being able to rotate when driven by the clamping arm;

a locking member being driven to selectively clamp and lock the C-shaped housing to stop it from rotating in such a manner that when the locking member releases the C-shaped housing, the clamping arm and the housing will rotate synchronously with the guide rod, and when the locking member locks the C-shaped housing, the guide rod is only able to drive the clamping arm to move up and down along the single linearly directed longitudinal gap of the C-shaped housing.

2. The handling device as claimed in claim 1, wherein the clamping arm is provided with a nut, and the clamping arm is screwed on the guide rod through the nut.

3. The handling device as claimed in claim 1, wherein the housing is tubular-shaped, and the axial length of the housing corresponds to the length of the guide rod.

* * * * *